Nov. 9, 1971  R. D. TUTT  3,618,508

AIR MIXING APPARATUS

Filed Feb. 27, 1970  3 Sheets-Sheet 1

INVENTOR.
RICHARD D. TUTT
BY
Drummond, Cahill & Phillips
ATTORNEYS

Nov. 9, 1971   R. D. TUTT   3,618,508
AIR MIXING APPARATUS

Filed Feb. 27, 1970   3 Sheets-Sheet 2

INVENTOR.
RICHARD D. TUTT
BY
Drummond, Cahill & Phillips
ATTORNEYS

INVENTOR.
RICHARD D. TUTT
BY
Drummond, Cahill & Phillips
ATTORNEYS

United States Patent Office 3,618,508
Patented Nov. 9, 1971

3,618,508
AIR MIXING APPARATUS
Richard D. Tutt, Tucson, Ariz., assignor to Krueger
Manufacturing Company
Filed Feb. 27, 1970, Ser. No. 15,042
Int. Cl. F24f 13/04
U.S. Cl. 98—38
6 Claims

ABSTRACT OF THE DISCLOSURE

A pair of discs mounted in spaced apart relation are mounted for rotation about an axis and are enclosed within a box structure. The enclosure includes openings for receiving inlet air to be mixed and an outlet opening for the mixed air; the enclosure also includes a vent opening for returning or "dumping" undelivered conditioned air to the conditioning system. A plurality of baffles are mounted between the discs and are positioned to open and close the various openings in the enclosure in accordance with the angular position of the discs.

---

The present invention pertains to mixing boxes, and more particularly, to apparatus for mixing cool and warm air to be delivered to a room in accordance with demands detected by a temperature sensing device, such as a thermostat.

The task of providing conditioned air to a room is complicated when numerous rooms are to be supplied from a central air conditioning system, as in commercial buildings. The requirements are complicated by the variable temperature settings or demands of the individual rooms which, in most prior art systems, result in varying air volume flow in the central system. For example, if 100% cool air is required by the thermostat setting of a room, air would flow from a supply duct into the room with the returned air being delivered back to the system through a return duct or vent; the return may typically be accomplished by permitting the air to escape into a plenum formed by a false ceiling above or adjacent a room. When less than 100% cool air is required in the room, the supply to the room is dampened, thus reducing the flow of air but increasing the back pressure presented to the central system. In some instances, warm air will be required and will have to be admitted to the room; under these circumstances, the cool air will be completely shut off and the warm air will be introduced into the return system. Apparatus for accomplishing the desired controlled air volume of entry into a room in accordance with the temperature demands of the room tends to become quite complex. Further, the variations in the demands of the various rooms connected to a central system can result in substantial pressure variations to the extent that the central systems operate very inefficiently.

It is therefore an object of the present invention to provide a simple air mixing apparatus for receiving and mixing warm and cool air for introduction into a room.

It is another object of the present invention to provide air mixing apparatus for connection to a single conditioned air supply and for tempering the conditioned air in accordance with the demands of a room.

It is still another object of the present invention to provide air mixing apparatus which will present a substantially constant back pressure to the conditioned air system to which it is connected.

It is still another object of the present invention to provide air mixing apparatus that will permit the return of all conditioned air delivered thereto while imposing a back pressure approximately equal to that incurred if the conditioned air were to pass through the room before being returned.

These and other objects of the present invention will become apparent to those skilled in the art as the description thereof proceeds.

Briefly, in accordance with the embodiment chosen for illustration, the air mixing apparatus incorporates a pair of spaced discs which are mounted for rotation about an axis. An enclosing box structure surrounds the discs and effectively encloses the space between the discs. The enclosure includes openings for receiving cool and warm conditioned air as well as openings for delivery of the mixed air to the room and a vent opening for returning conditioned air to the central conditioning system. The input openings to the enclosure are secured to input ducts, one of which incorporates heating coils for warming air passing therethrough. Baffles are mounted between the discs and are secured thereto to permit the opening or closing of the openings in the enclosure by rotation of the discs. The baffles are secured to the discs to enable any desired mixture of cool and warm air to be admitted to the room while maintaining a constant volume flow and also permit 100% return of cool conditioned air to the central system while imposing a back pressure or resistance to the flow of the air approximately equal to that that would have occurred if the conditioned air had first passed through the room before returning to the system.

The present invention may more readily be described by reference to the accompanying drawings, in which.

Figure 1:
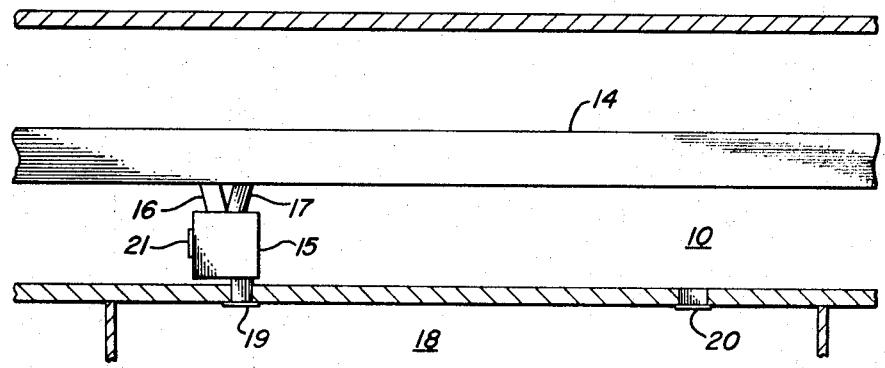
FIG. 1 is a top view, partly in section, of a building structure illustrating a typical construction for incorporating the air mixing apparatus of the present invention.
Figure 2:
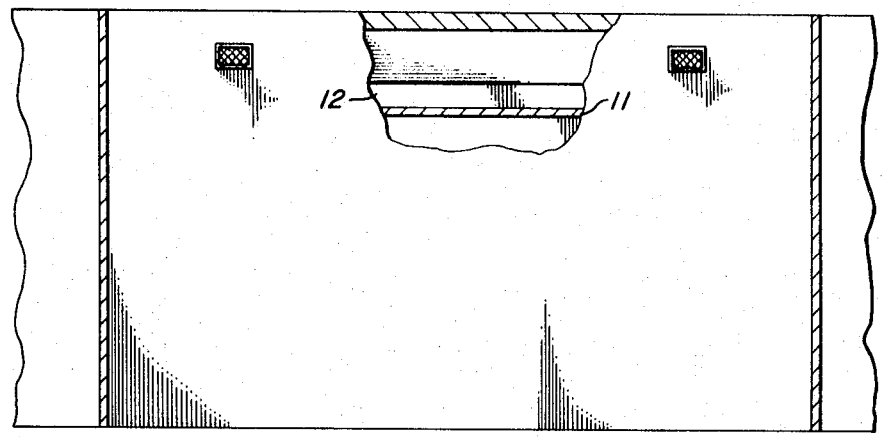
FIG. 2 is a side elevational view, partly broken away, of the illustration of FIG. 1.
Figure 3:
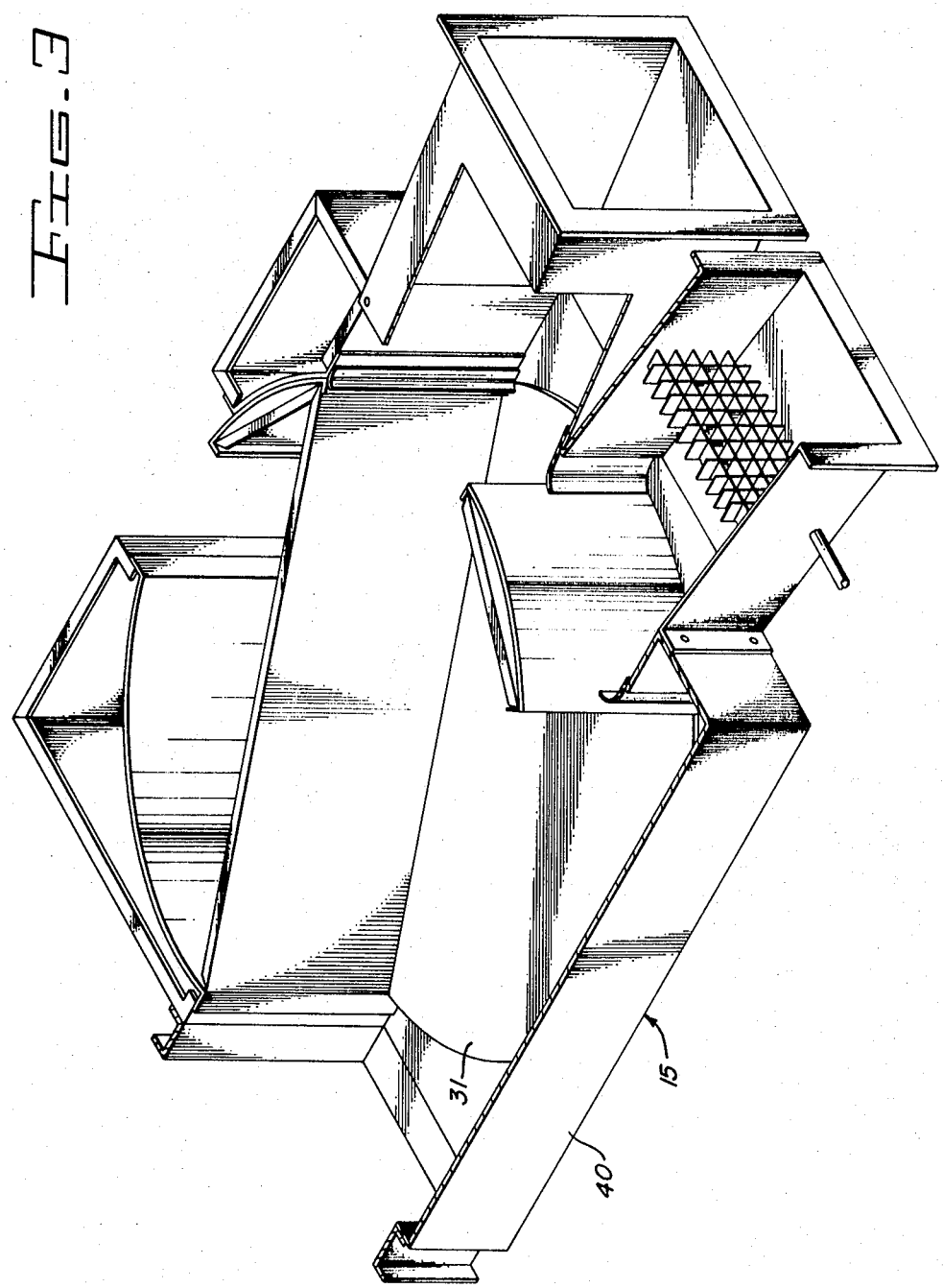
FIG. 3 is a perspective view, partly in section, of air mixing apparatus constructed in accordance with the teachings of the present invention.

Referring now to FIGS. 1 and 2, a typical construction installation is shown for a building, such as a hotel, wherein numerous rooms are to be supplied from a central conditioning system and wherein each room is to be provided with a temperature controlling device, such as a thermostat. A hallway 10 is provided with a false ceiling 11, thereby forming a plenum 12 thereabove. A conditioned air duct 14 extends through the plenum and provides a conditioned air supply to a plurality of air mixing apparatus, such as that shown at 15. The apparatus 15 includes inlet ducts 16 and 17, as will be described more completely hereinafter, and supplies air to a room 18 through a diffuser 19. Air from the room 18 is returned to the air conditioning system via the plenum 12, access to which is provided by a return air register 20. A vent opening 21 is provided in the apparatus 15 to bypass the room 18 and communicates with the plenum 12, as will be described later.

Referring now to FIGS. 3–6, the air mixing apparatus 15 is shown incorporating a pair of discs 30 and 31 mounted in spaced-apart relation for rotation about a shaft 32 secured to the disc 30. The discs are secured to each other and held in spaced-apart relation by a plurality of baffles 35, 36, and 37. The discs are mounted within an enclosure 40 which effectively encloses the space between the discs; the enclosure includes a first inlet opening 41, a second inlet opening 42, connected to inlet ducts 43 and 44 respectively. The inlet duct 44 is provided with a heating coil 45 which may be connected to a source of heat energy, such as hot water or steam. Alternatively, the heating coil may be an electrical heating element that may be connected to an appropriate electrical supply.

Figure 6:
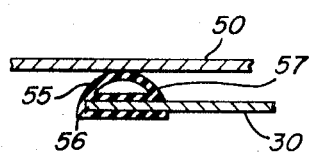
FIG. 6 is an enlarged cross-sectional view of a portion of the apparatus of FIGS. 3, 4, and 5, showing a resilient sliding seal utilized to seal the rotating discs to the enclosure of the present invention.

The enclosure 15 also includes an output opening 46 and a venting opening 47. A top panel 50 and a bottom panel 51 complete the enclosure 15, the top panel 50 supporting a suitable journal 52 for the shaft 32. Air entering the input openings 41 and 42 through the ducts 43 and 44 enters the space between the discs 30 and 31 and is directed to either the output opening 46 of the vent opening 47 by means of the baffles 35, 36, and 37. The air is prevented from spilling around the edges of the discs (to escape to an opening other than the chosen opening) by means of a flexible resilient gasket 55 (FIG. 6) which is secured about the edge 56 of the discs. The gaskets include a domed portion 57 forming a sliding seal with the top or bottom panel 50 and 51 of the enclosure 15. The enlargement of FIG. 6 illustrates only the gasket secured to the upper disc 30, it being obvious to those skilled in the art that a similar gasket will be affixed to the lower disc 31. It will also be obvious to those skilled in the art that the gasket 55 may be replaced by a circumferential gasket that would engage stationary curved panels provided in the mixing apparatus adjacent the edge of the discs to form a sliding seal in the plane of the discs.

Figure 4:
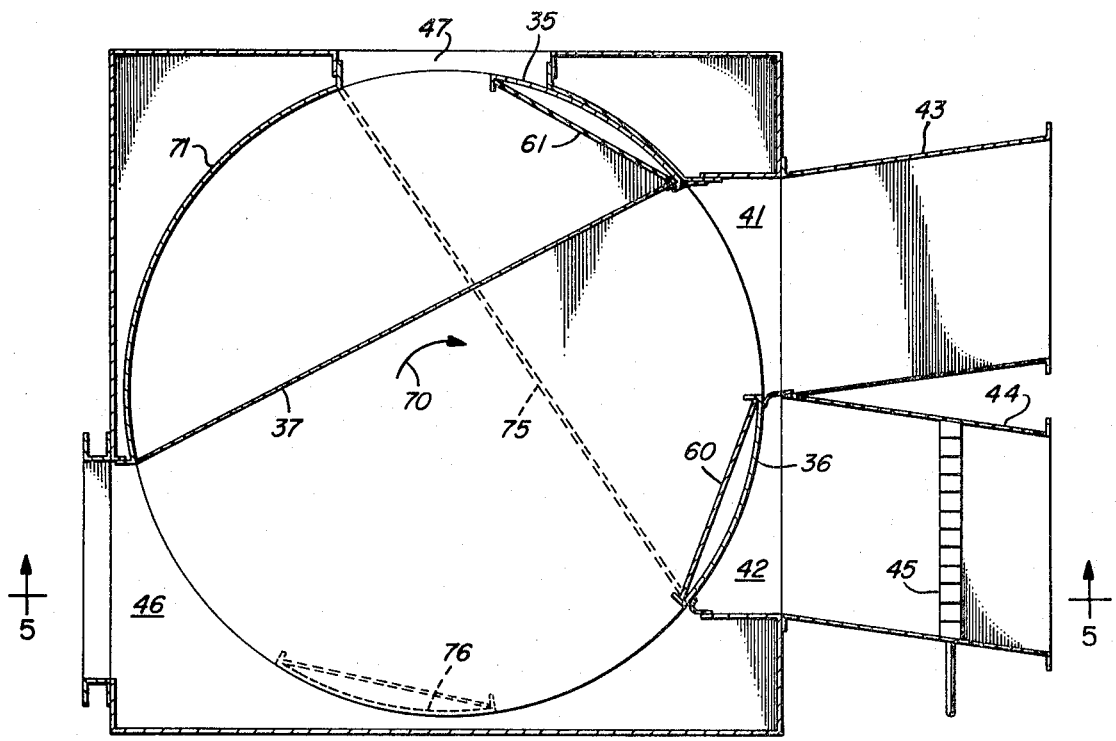
FIG. 4 is a top view of the apparatus of the present invention with the top panel removed to show the inside of the air mixing apparatus.

The baffle 36 may be reinforced by a plate 60 as shown in FIG. 4. Similarly, the baffle 35 may be reinforced by a plate 61 which, in the embodiment chosen for illustration, may economically be formed integrally with the baffle 37. Baffles 35 and 36 are of sufficient length to cover and thus close input opening 41 or 42. The baffle 37 extends across the disc to close either vent opening 47 or output opening 46.

Figure 5:
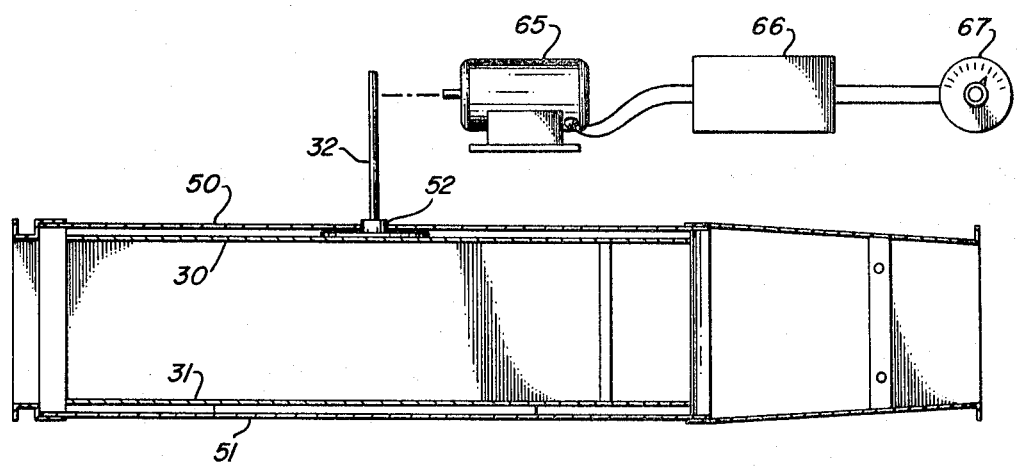
FIG. 5 is a sectional view of FIG. 4 taken along line 5—5.

The shaft 32 may be connected to any convenient positioning means for positioning the discs (and thus the baffles) in accordance with the temperature demands of a room. In FIG. 5, a positioning motor 65, a positioning motor control 66, and a thermostat 67 are schematically represented and are indicated as secured to the shaft 32 for rotating the discs.

The present invention may now more readily be understood by describing the operation of the apparatus. The position shown in FIG. 4 illustrates the position of the discs 30 and 31 and the baffles 35, 36, and 37 when the air mixing apparatus is called upon to deliver maximum cooling. Cool air enters from the conditioned air supply duct 14 (FIG. 1) to the duct 43, through the input opening 41 and out the output opening 46. The cool conditioned air encounters little obstruction in its passage through the apparatus and the baffle 36 prevents the admission of warm conditioned air while the baffle 37 prevents escape of the cool conditioned air to the vent opening 47. When the thermostat setting in the room indicates less than maximum cooling, the positioning motor, such as that shown at 65 in FIG. 5, rotates the shaft 32 and thus the discs 30 and 31 in the direction indicated by the arrow 70 in FIG. 4. It may be seen that as the discs are rotated in a clockwise direction, the baffle 36 will uncover a portion of the inlet opening 42 while the baffle 35 will close a corresponding portion of the inlet opening 41. The total area provided by the unobstructed portions of the two openings 41 and 42 will remain constant and the air volume rate admitted to the mixing apparatus will remain constant. As the requirement for warmer air increases, the baffle 35 continues to close the opening 41 while the baffle 36 continues to open the opening 42. When in the maximum heating position, the baffle 36 completely closes the opening 41 while the opening 42 becomes unobstructed. During positioning of the baffles 35 and 36 to provide an appropriate mixture of cool and warm conditioned air, the baffle 37 continues to prevent the escape of conditioned air to the vent opening 47. A circumferential plate 71, together with the gasket 55 and the baffle 37, isolate the vent opening 47 regardless of the position of the baffle 37 until an extreme or "dump" position is reached. Thus, the air mixing apparatus of the present invention presents a constant back pressure to the central system without regard to the proportions of warm or cool air being required by the individual rooms. The heating coil 45 will, of course, present some additional resistance to the flow of air when the apparatus is positioned in the maximum heating position, but the effect of the coil is inconsequential.

When the air conditioning system is to be completely shut off from the individual room, such as when the room is unoccupied for a longer period of time, substantial economy may be achieved by completely shutting off conditioned air to the room. The variations in the supply pressure caused by shutting off several rooms should be avoided, as discussed previously. The apparatus of the present invention permits the shutting off of conditioned air from the room without affecting the back pressure sensed by the central system. When the system is to be shut off, the thermostat 67 or other appropriate control is simply set in an off position, causing the positioning motor 65 to rotate the discs 30 and 31 to a maximum counterclockwise position. Appropriate stops (not shown) may be provided to perfectly align the discs at the extremes of their angular positions. Referring to FIG. 4, the dumping position of the apparatus is shown by the broken lines 75 representing the baffle 37 and the broken lines 76 representing the baffle 36. When in the extreme rotated position or dumping position as shown by the dotted lines of FIG. 4, it may be seen that the baffle 37 (broken line 75) closes the output opening 46 and opens the vent opening 47. The baffle 36 (shown by the broken line 76) has moved out of operative position and the baffle 35 has now assumed the position of the baffle 36 to close the inlet opening 42. With the baffles thus arranged, cool conditioned air enters the mixing apparatus and encounters the baffle 37 to effect a substantial 90° turn to exit through the vent opening 47 into the return air plenum 12 (FIG. 2). The resistance encountered by the cooled air thus shunted to the return air plenum (the resistance of the 90° deflection) presents a back pressure to the central system approximately equal to the same back pressure that would be encountered if the conditioned air were to pass through the mixing apparatus into the room and back through the return air register to the plenum.

The apparatus of the present invention therefore enables a central air conditioning system to be designed for a predetermined volume rate of flow and back pressure while permitting individual rooms to be tempered in accordance with individual demands and also permits maximem economy to be practiced by shutting off individual rooms without affecting volume rate of flow or back pressure. The apparatus is simple and economically produced to provide rugged, reliable conditioned air mixing and efficient continued air utilization.

I claim:

1. Air mixing apparatus for connection to warm and cool air sources and for mixing and delivering said warm and cool air, comprising: a first and a second disc spaced apart from each other and mounted for rotation about an axis passing through said discs; a fixed enclosure member surrounding said discs and enclosing the space between said discs; means defining first and input openings, a venting opening, and an output opening in said enclosure member for connecting to a warm air supply, a cool air supply, a return air system, and to a room inlet respectively; a first baffle extending between and secured to said discs adjacent an edge thereof, said first baffle having a length sufficient to close either said first or said second input openings when positioned opposite said first or second input openings repectively; a second baffle extending between and secured to said discs adjacent an edge thereof, said second baffle having a length sufficient to close said second input opening when positioned opposite said second input opening; a third baffle extending between and secured to said discs positioned to close said venting opening when said output opening is open and to close said output opening when said venting opening is closed; said second baffle positioned relative to said first baffle to progressively open or close said second inlet opening as said first baffle progressively closes or opens said first inlet opening.

2. The combination set forth in claim 1, wherein said fixed enclosure includes a top and a bottom panel for completely enclosing said discs and the space between said discs.

3. The combination set forth in claim 1, including first and second inlet ducts connected to said first and second input openings respectively.

4. The combination set fort in claim 2, wherein each of said discs include a resilient gasket secured about the edge thereof forming a sliding seal with the top and bottom panels respectively of said enclosure.

5. The combination set forth in claim 2, including a shaft secured to said discs at the rotational axis thereof and extending through one of said panels for connection to a positioning drive.

6. The combination set forth in claim 3, wherein one of said inlet ducts includes a heating coil mounted therein.

References Cited

UNITED STATES PATENTS

| | | | |
|---|---|---|---|
| 3,363,534 | 1/1968 | Spradling | 236—13 X |
| 1,153,778 | 9/1915 | Gibbs | 137—625.14 |
| 2,908,293 | 10/1959 | Johnson | 137—597 X |

FOREIGN PATENTS

| | | | |
|---|---|---|---|
| 503,299 | 12/1954 | Italy | 98—33 |

WILLIAM E. WAYNER, Primary Examiner

U.S. Cl. X.R.

137—625.14; 165—16; 236—13